United States Patent [19]

Chavkin et al.

[11] Patent Number: 4,731,246

[45] Date of Patent: Mar. 15, 1988

[54] LIQUID BRAN DRINK

[75] Inventors: Leonard Chavkin, Bloomsbury, N.J.; Leonard Mackles, New York, N.Y.

[73] Assignee: Product Resources International, Inc., New York, N.Y.

[21] Appl. No.: 793,174

[22] Filed: Oct. 31, 1985

[51] Int. Cl.$^4$ .................... A61K 35/78; A61K 31/715

[52] U.S. Cl. .................... 424/195.1; 514/60; 514/892

[58] Field of Search .................... 426/74, 806, 804, 71, 426/590, 595, 598, 629, 615; 514/892, 905, 949, 60; 424/195.1

[56] References Cited

U.S. PATENT DOCUMENTS

| | | | |
|---|---|---|---|
| 366,992 | 7/1887 | Armstrong | 424/195.1 |
| 1,189,133 | 6/1916 | Kellogg | 424/195.1 |
| 1,206,804 | 12/1916 | Block | 424/195.1 |
| 1,262,472 | 4/1918 | Eisenbeiss | 426/811 |
| 2,295,643 | 9/1942 | Emery et al. | 426/74 |
| 4,328,217 | 5/1982 | Gabby et al. | 424/195.1 |
| 4,551,331 | 11/1985 | Ruden | 424/195.1 |

FOREIGN PATENT DOCUMENTS

| | | | |
|---|---|---|---|
| 0119479 | 2/1983 | European Pat. Off. | 514/892 |
| 8000658 | 4/1980 | PCT Int'l Appl. | 514/892 |

*Primary Examiner*—J. R. Brown
*Assistant Examiner*—John W. Rollins, Jr.
*Attorney, Agent, or Firm*—Omri M. Behr

[57] ABSTRACT

There is provided a palatable pre-mixed bran drink comprising heat treated, degelled bran in the presence of hydrated colloidal magnesium aluminum silicate and an acidification agent. The drink has good mouthfeel and may be used as a bulk supplement to diet.

10 Claims, No Drawings

LIQUID BRAN DRINK

BACKGROUND OF THE INVENTION

Over the last decade numerous medical studies have shown that the addition of undigestible fiber, in particular, cellulose fiber, to human diets aids the digestive process. Furthermore, such fibers have been clinically reported as being helpful in the treatment of diverticulitis and may be useful in the prevention of cancer of the colon. Numerous sources of fiber are known, popular among these sources is commercial bran obtained from the milling of wheat, oats, corn or soybeans which is a variable product containing various concentrations of indigestible celluloses and starch. These commercial brans have been primarily used for the manufacture of food products and have been incorporated because of their very high fiber content, in various breakfast cereals. In addition to the aforesaid general qualities of fiber material, the Food and Drug Administration has recognized bran as a safe and effective laxative when taken in the amounts of between about 6 and about 14 grams per day.

One of the principal problems with increasing the fiber intake of human diets has been the difficulty in compounding high fiber content materials in a manner which is not only effective but is palatable and sufficiently attractive in taste to make it appealing to the consumer. Various formulations such as cookies, confections, dispersible powders, chewable tablets, and the like are known but are generally recognized as deficient in palatability or convenience.

Dispersible powders containing fibrous materials such as psyllium or bran powders have been made and used for the in situ preparation of drinks containing them.

Premixed, ready-to-drink fiber containing products have not heretofore been made. Psyllium is not suitable in such products since it gels rapidly in water.

It is further generally recognized that cereal brans would be more suitable for the preparation of aqueous dispersions but they have undesirable physical characteristics that make the preparation of stable liquid products very difficult. They are coarse, fibrous, have a strong characteristic taste and a grainy mouthfeel. Furthermore, they settle and cake rapidly when dispersed in aqueous media and are difficult to redisperse into uniform suspensions.

We have now found how to overcome these problems.

The recognition of bran as a useful laxative product was recognized as early as U.S. Pat. No. 366,992 to Armstrong whose product however was a solid material. A bran food is also disclosed by U.S. Pat. No. 1,189,133 to John L. Kellogg and a similar solid composition in U.S. Pat. No. 1,206,804 to Ashley V. Black. An early mention of a beverage utilizing bran is found in U.S. Pat. No. 1,631,830 to Laurel A. Negly and Percy S. Black whose intention appears to be produce either a syrup or a powder which can be suspended to form a beverage of coffee-like taste. Apart from recognition of the "ingredients" as being "healthful" there is no disclosure of the bran being maintained with any degree of particulate integrity.

U.S. Pat. No. 1,262,472 to William J. Eisenbeiss discusses a non-alcoholic carbonated beverage in which bran is soaked in saline solution below the boiling point of the liquid in order to extract the albumin from the bran. It is not clear however, whether after extraction the bran solids are discarded or whether they are kept in the mixture with the other components. Since the patentee speaks of "steeping the bran" the indications would be that the solid materials are discarded after the procedure.

The medicinal history of bran for laxative purposes is well summarized in U.S. Pat. No. 4,328,215 to Gabby et al. who discloses a solid bran containing composition in tablet form as a bulking or laxative agent.

It will thus be seen that heretofore the art does not teach a bran drink containing substantial proportions of fibrous material in substantially intact form.

SUMMARY OF THE INVENTION

It has been found that a palatable bran drink may be obtained by heating wheat bran in the presence of a physiologically acceptable acidification agent and an inorganic complex of hydrated colloidal magnesium aluminum silicate. If desired, there may be added at least one additional component selected from the group consisting of food grade surfactant, sweetening agent, food grade preservative, food grade flavorant and food grade colorant. These additional components may be added either before or after the aforesaid heating step as may be convenient, though it is better to add flavorants after the heating step.

The thus obtained bran drink is an aqueous potable suspension of ground wheat bran consisting essentially of wheat bran having from about 30 to about 50% by weight of starch and from about 50-70% by weight of fiber, and a final particle size of less than 40 mesh, said bran comprising between about 5 and about 15% by weight of the suspension, a physiologically acceptable acidification agent in a quantity sufficient to provide a pH of between about 3.5 and 5.5 to said suspension and a aluminum inorganic complex of hydrated colloidal aluminum magnesium silicate having a silicon dioxide content of from about 62% to 69% by weight, aluminum oxide from about 10% to about 15% by weight of magnesium oxide from about 3% to about 12% by weight wherein there is utilized between about 0.1 and about 1.0% by weight of said suspension (preferably about 0.2%).

The aforesaid aqueous potable suspension is formed by the sequential steps of heating suitable powdered wheat bran, preferably of between less than about 40 mesh together with the acidification agent and the aforesaid inorganic complex, with water at a temperature of from about 180° to about 210° F. for from about 20 to about 60 minutes. The mixture is cooled to ambient temperature and subjected to sheer stress to break any formed gel and prevent further gel formation.

In the process of the present invention wheat bran having an original particle size of less than about 40 mesh is suspended in water to a concentration of between about 5 and about 15% by weight, to this suspension is added a physiologically acceptable acidification agent in a quantity sufficient to provide a pH of between about 3.5 and about 5.5. Any physiologically acceptable acidification agent may be used. Such an agent may be an inorganic agent such as phosphoric acid or any of the generally used fruit acids such as citric, tartaric, adipic, malic, or fumaric acids. The chemical nature of the acidifier is not important provided it is physiologically acceptable.

There is also added between about 0.1 to about 1.0% preferably about 0.2% by weight of the suspension, of an inorganic complex of hydrated colloidal magnesium aluminum silicate. Any of the complexes in this general catogory sold under the trademark of Veegum by R. J. Vanderbilt Co., Norwalk, Conn. may be utilized. It has been found however that Veegum H V gives rise to a product of specially desirable results. Veegum H V contains about 10.7% of aluminum oxide and about 11.9% of magnesium oxide and a silicon dioxide concentration of about 62%.

This mixture is then heated but only to below the boiling point of water. Thus, it is preferred to heat the mixture to from about 180° to about 210° F. for a period of from about 20 to about 60 minutes. The mixture is then cooled, as it cools, it has a tendency to gel. Such a gel, of course, makes consumption of the material as a drink rather difficult and unpalatable. The gel must therefore be broken. While it is acceptable to allow the mixture to cool to ambient temperature and then break the gel, it is procedurally simpler to subject the material to sheer stress, preferably but not critically, in a continuous manner during the cooling stage in order to break gels which are formed and prevent further gel formation.

There are basically two approaches which we have found operable and can be taken to apply the sheer stress: homogenizing, or passing through a colloid mill. The homogenizing may be carried out by forcing the mixture, as it cools, through a narrow orifice at a homogenizing pressure of between about 2000 to about 6000 psig. Alternatively, where a colloid mill is utilized, said mill is set up to have a separation of from about 10 to about $30 \times 10^{-3}$ inch and run at from about 1500 to about 2500 rpm.

The resultant product, in which the original wheat bran constitutes from about 30 to about 50% by weight of starch, and about 50-70% by weight of fiber now has a particle size of less than about 40 mesh and which, while some settling may occur upon storage, has particles which may be readily resuspended upon mild agitation, such as shaking the bottle, and which will remain in satisfactory suspension for the period of time necessary to drink it. The thus prepared material has an excellent and palatable mouthfeel. The composition may however be enhanced by the addition of at least one surfactant comprising between about 0.1 and 1.0% by weight of the entire suspension, at least one sweetener of from about 15 to about 40% by weight of the entire suspension, at least one preservative of from about 0.1 to about 0.6% by weight, at least one flavorant of between about 0.1 and 1.0% by weight of the entire suspension and a colorant from 0.01-1% by weight (e.g. Titanium Dioxide 1%).

One or more of any of the foregoing groups of additives may be employed and they may be added either before or after the heating step. Any physiologically acceptable member of each category may be employed. Thus, as examples, but not for purposes of limitation, there may be mentioned as surfactants: sorbitan monostearate, polyoxyethylene sorbitan, monolaurate, monoleate, or monostearate; as sweetners: sucrose, fructose, glucose, sorbitol, saccharin, corn syrup, hydrogenated corn starch hydrolysate; as preservatives: sorbic acid and its salts, benzoic acid and its salts, methyl paraben and propyl paraben; and as flavorants or colorants there may be used any suitable food flavorant or colorant.

The product of the present invention is a very mild "bulking" laxative. It produces no sudden laxative effect such as, for example, castor oil. It does, however, due to the bulking effect facilitate the colonic function by providing bulk. The actual concentration of bran in the consumed product is, to a certain extent, a matter of taste and choice. Since the FDA bulk laxative recommendation is 6-14 grams per day, such a requirement can be met by the ingestion of about 2-4 ounces of a 10% bran product per day. In view of the total safety of the product no harm is done by a higher intake.

EXAMPLE I

| | Bran Drink Composition | |
|---|---|---|
| 1. | Wheat Bran, ground | 10.00% |
| 2. | Hydrogenated Glucose syrup (75%) Lycasin | 25.00 |
| 3. | Citric Acid | 0.20 |
| 4. | Pot. Sorbate | 0.05 |
| 5. | Sod. Benzoate | 0.05 |
| 6. | Complex Magnesium Aluminum Silicate (Veegum H.V.) | 0.20 |
| 7. | Sorbitan 60 mono stearate | 0.20 |
| 8. | Flavor | 0.10 |
| 9. | H$_2$O | 64.20 |
| | | 100.00% |

All percentages are by wt.
pH = 5.05

The wheat bran is powdered wheat bran of less than 40 mesh size and is suspended in water with the citric acid and Veegum. The mixture is heated for 30 minutes at between 180° and 210° F. The source of heat is removed and the mixture is circulated thru a colloid mill (Gifford Wood Mill manufactured by Gifford Wood, Inc.) until ambient temperature is acheived. The mill is set for roller separation of $20 \times 10^{-3}$ inch running at 2000 rpm.

In accordance with the foregoing proceedure, but in place of the colloid mill there may be used a homogenizer manufactured by Manton Gaulin, Inc.) in which the mixture is passed thru a small, set aperture at 4000 psig.

Two fluid ounces of the above suspension provide a dose of 6 grams of bran, a safe and effective laxative dose of fiber. This dosage may be imbibed from 1 to 4 times per day.

EXAMPLE II

| | | |
|---|---|---|
| 1. | Wheat Bran, ground | 10.0% |
| 2. | Hydrogenated corn starch hydrolysate | 25.0 |
| 3. | Phosphoric acid | 0.45 |
| 4. | Titanium Dioxide | 1.0 |
| 5. | Veegum H V | 0.2 |
| 6. | Sorbitan 60 Monostearate | 0.2 |
| 7. | Potassium Sorbate | 0.25 |
| 8. | Sodium Benzoate | 0.25 |
| 9. | Flavor | 0.6 |
| 10. | Purified water, enough to make | 100.0% |

All percentages are by wt.
pH = 4.5

The wheat bran is powdered wheat bran of less than 40 mesh size and is suspended in water with the citric acid and Veegum. The mixture is heated for 30 minutes at between 180° and 210° F. The source of heat is removed and the mixture is circulated thru a colloid mill (Gifford Wood Mill manufactured by Gifford Wood, Inc.) until ambient temperature is acheived. The mill is set for roller separation of $20 \times 10^{-3}$ inch running at 2000 rpm.

In accordance with the foregoing proceedure, but in place of the colloid mill there may be used a homogenizer manufactured by Manton Gaulin, Inc.) in which the mixture is passed thru a small, set aperture at 4000 psig.

Two fluid ounces of the above suspension provide a dose of 6 grams of bran, a safe and effective laxative dose of fiber. This dosage may be imbibed from 1 to 4 times per day.

We claim:

1. An aqueous potable suspension of ground wheat bran consisting substantially of:
   (a) wheat bran containing from about 30 to about 50% by weight of starch and about 50-70% by weight of fiber, having a particle size of less than 40 mesh and comprising between about 5 and about 15% by weight of the suspension,
   (b) a physiologically acceptable acidification agent in a quantity sufficient to provide a pH of between about 3.5 and about 5.5 to said suspension,
   (c) an inorganic complex of hydrate colloidal magnesium aluminum silicate wherein the silicon dioxide content is between about 62 and about 69% by weight, and the aluminum oxide content is from about 10 to about 15% by weight and the magnesium oxide content is about 3 to about 12% by weight, said complex comprising between about 0.1 and about 1.0% by weight of said suspension.

2. A suspension of claim 1 wherein the silicon dioxide content is about 62%, the magnesium oxide content is about 11.9% and the aluminum oxide content is about 10.7%, all by weight.

3. A suspension of claim 1 additionally comprising at least one additional component selected from the group consisting of:
   food grade surfactant: about 0.1 to about 1.0% w/w,
   food grade sweetner: about 15 to about 40% w/w,
   food grade preservative: about 0.1 to about 0.6% w/w,
   food grade flavorant: about 0.1 to about 1.0% w/w, and
   food grade colorant: about 0.01 to about 1% w/w.

4. A process for the preparation of an aqueous potable suspension of ground wheat bran of claim 1:
   said suspension being formed by the sequential steps of
   (i) heating wheat bran, the acidification agent and the complex with water at a temperature of from about 180° to about 210° for from about 20 to about 60 minutes
   (ii) cooling the mixture to ambient temperature, and
   (iii) subjecting the thus formed mixture during cooling to shear stress to break any formed gel and prevent further gel formation.

5. A process of claim 4 wherein step (iii) comprises homogenizing the mixture at between about 2000 to about 6000 psig.

6. A process of claim 4 wherein step (iii) comprises homogenizing the mixture in a colloid mill having a separation of between about 10 and about $30 \times 10^{-3}$ inch at from about 1500 to about 2500 rpm.

7. A process of claim 4 additionally comprising adding at least one additional component selected from the group consisting of:
   food grade surfactant: about 0.1 to about 1.0% w/w,
   food grade sweetner: about 15 to about 40% w/w,
   food grade preservative: about 0.1 to about 0.6% w/w,
   food grade flavorant: about 0.1 to about 1.0% w/w, and
   food grade colorant: about 0.01 to about 1% w/w.

8. A process of claim 4 wherein the components to be added are added after the heating step.

9. A process of claim 7 wherein the components to be added are added before the heating step, provided said components are other than the flavorant.

10. A process of claim 9 wherein the components to be added are added before the heating step, provided said components are other than the flavorant and the flavorant added after the heating step.

* * * * *